United States Patent
Nonren, Jr.

[11] Patent Number: 6,153,096
[45] Date of Patent: Nov. 28, 2000

[54] SHROUD FOR BOTTLE MOUNTED FILTERS

[75] Inventor: John E. Nonren, Jr., Clearwater, Fla.

[73] Assignee: Innova Pure Water, Inc., Clearwater, Fla.

[21] Appl. No.: 09/132,143

[22] Filed: Aug. 10, 1998

[51] Int. Cl.[7] .............................. C02F 1/28; B01D 27/00; B01D 39/16
[52] U.S. Cl. ...................... 210/238; 210/282; 210/464; 210/469; 210/472; 222/189.08
[58] Field of Search .................................. 210/282, 232, 210/467, 468, 469, 472, 464, 238; 222/189.08

[56] References Cited

U.S. PATENT DOCUMENTS

| | | |
|---|---|---|
| 703,654 | 7/1902 | Hall . |
| 3,335,917 | 8/1967 | Knight . |
| 5,045,195 | 9/1991 | Spaugrod et al. . |
| 5,122,272 | 6/1992 | Iana et al. . |
| 5,273,649 | 12/1993 | Magnusson et al. . |
| 5,401,399 | 3/1995 | Magnusson . |
| 5,431,813 | 7/1995 | Daniels . |
| 5,545,315 | 8/1996 | Lennemon . |
| 5,609,759 | 3/1997 | Nohren, Jr. et al. . |
| 5,653,878 | 8/1997 | Reid . |
| 5,928,512 | 7/1999 | Hatch et al. . |

FOREIGN PATENT DOCUMENTS

| | | |
|---|---|---|
| 45-000637 | 1/1970 | Japan . |
| 93/18837 | 9/1993 | WIPO . |

OTHER PUBLICATIONS

PentaPure Oasis product and packaging, 1996.

*Primary Examiner*—Thomas M. Lithgow
*Attorney, Agent, or Firm*—Nixon & Vanderhye P.C.

[57] ABSTRACT

A radial flow filter for use in a bottle, such as a carbon block filter, having a substantially tubular solid wall siphon shield or shroud mounted at one end of the filter element and defining an annular siphon space. The shield is mounted adjacent one of the filter when it is connected to a cap for closing a bottle, having a manual valve (such as a push-pull valve), and is mounted adjacent the other end of the filter when the filter is connected to a drinking straw. The siphon shield allows dispensing of almost all of the water present at the cap when the bottle is inverted for the cap-mounted embodiment, or adjacent the bottom of the bottle for the straw-mounted embodiment, without drawing significant amounts of air through the filter through non-submerged portions of the filter. That is, the maximum amount may be dispensed from the bottle without aspirating air through the filter.

23 Claims, 2 Drawing Sheets

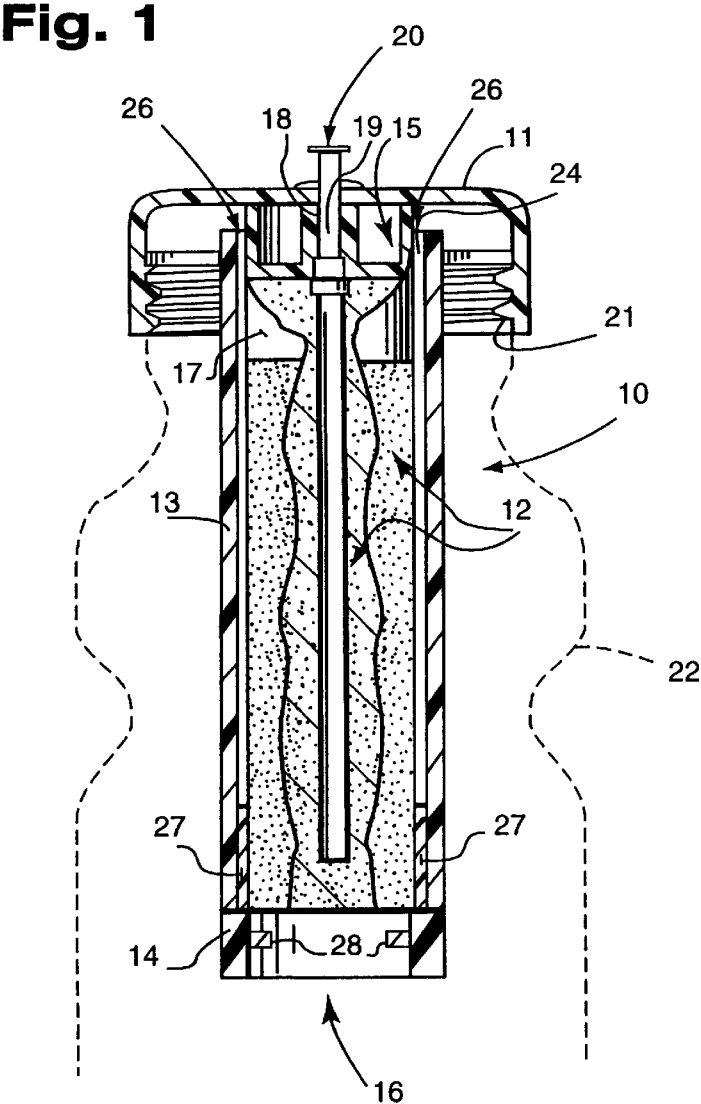
Fig. 1
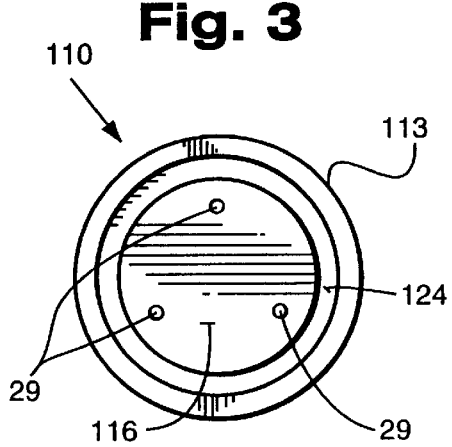
Fig. 3      Fig. 4

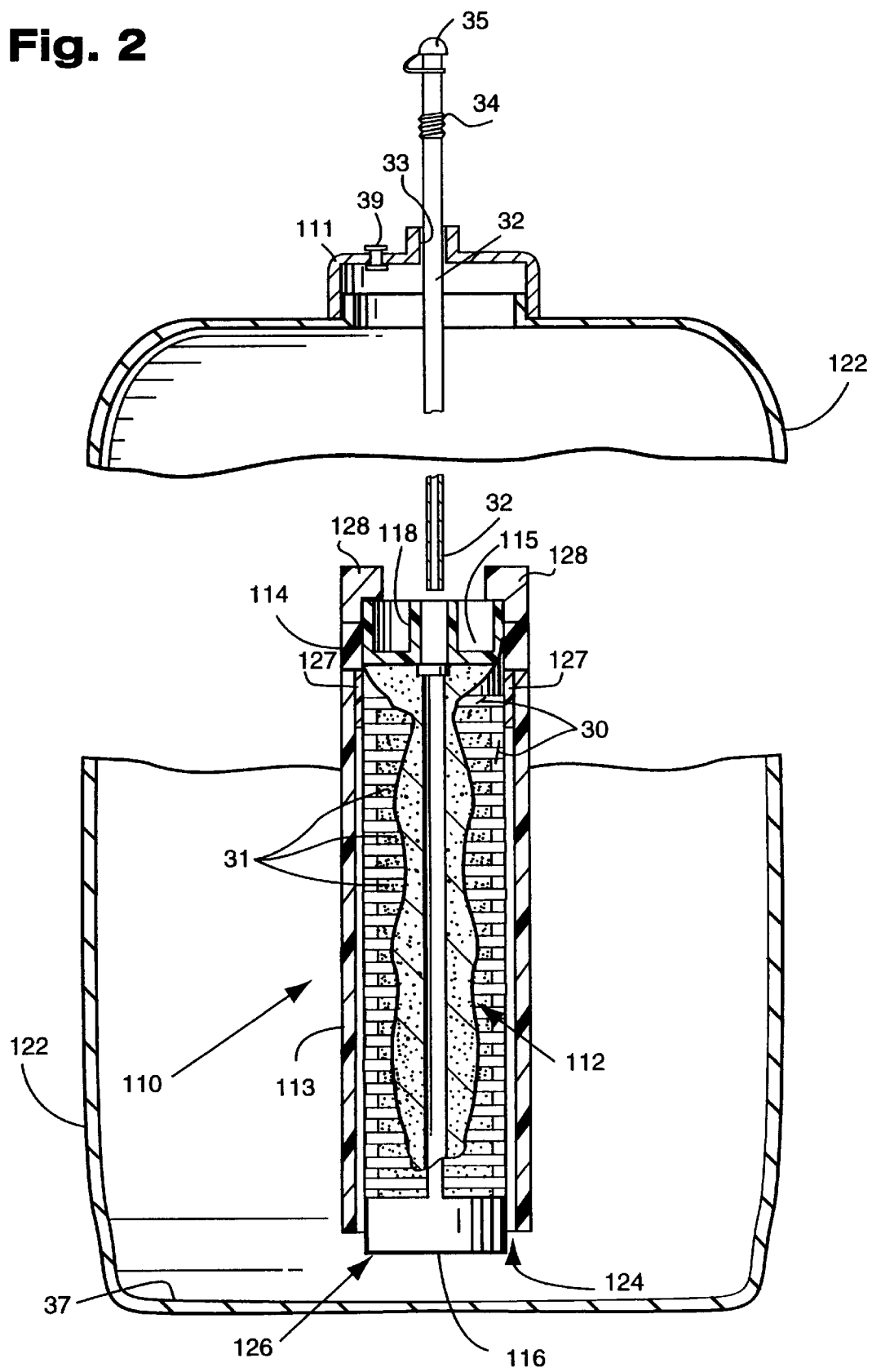

SHROUD FOR BOTTLE MOUNTED FILTERS

BACKGROUND AND SUMMARY OF THE INVENTION

U.S. Pat. No. 5,609,759 and copending application Ser. No. 09/008,845, filed Jun. 20, 1998 (the disclosures of which are hereby incorporated by reference herein) illustrate and describe a very successful bottle mounted filter assembly primarily for significantly reducing the level of chlorine in tap water flowing through the filter out of the bottle. The carbon block filter element illustrated in the U.S. Pat. No. 5,609,759 patent also be used mounted at the bottom of a drinking straw disposed within a sport bottle, as is conventional. In both cases, however, since the filter is a radial flow filter, air can be ingested through the filter (aspirate) when the bottle is approaching empty, which results in an unpleasant gas filled issuance of water for as much as the last two to five ounces of the water being dispensed from the bottom (depending upon the bottle size). It is highly desirable to be able to eliminate or minimize the air being ingested through the filter so that substantially gas-free dispensing of water from the bottle may take place until right near the empty point.

According to the present invention a filter assembly is provided which significantly reduces, and in fact can substantially eliminate, the amount of air ingested through the filter for both cap mounted filters and straw mounted filters in conventional bottles with filters, such as shown in U.S. Pat. No. 5,609,759. This is accomplished, according to the invention, in a simple yet effective manner with a minimal addition cost in manufacture of the filter.

According to one aspect of the present invention a filter assembly is provided comprising the following components: A primarily radial flow filter element comprising a substantially prismatic or cylindrical body of filtering material having a first end through which filtered water flows, and a second end opposite the first end. A substantially tubular siphon shield (shroud) having cross-sectional interior dimensions greater than the exterior cross sectional dimensions of the filter element. A mounting element which mounts the siphon shield around the filter element so that there is a siphon space between the filter element and the siphon shield. And the siphon space cooperating with the siphon shield to significantly reduce the amount of air radially flowing through the filter element with water when parts of the filter element are uncovered by water. The siphon shield (or shroud) is normally independent of the filter and housing so that the shield may be retrofit onto existing filters, and may be removed from a filter and reoriented 180° to change from a straw type filter to a cap type filter, and vice versa.

The filtering material of the radial flow filter element preferably comprises a hollow substantially continuous self-supporting, self-venting body of activated carbon and binder having a porosity of about 10–120 microns, and capable of reducing by at least 50% the amount of chlorine in water flowing through the filter at a flow rate of about 5 milliliters, such as disclosed in U.S. Pat. No. 5,609,759 and the copending application mentioned above, the disclosures of both of which have been incorporated by reference herein. However, other filter elements may also be utilized containing virtually any type of conventional technology, including ceramic filter elements, polymer extraction technology filter elements, iodinated resins, etc.

According to one embodiment of the invention, the filter element first end is operatively connected to a cap for closing the open end of a bottle, the cap having a manual valve (e.g. conventional push-pull valve, baby bottle nipples, etc.) associated therewith; and the mounting element mounts the siphon shield adjacent the second end of the filter element so that water can substantially only flow into the siphon space from adjacent the first end of the filter element, and wherein the siphon space is readily accessible to water adjacent the cap. The mounting element preferably comprises a mounting ring, and the siphon space is preferably substantially annular. For example, the substantially annular siphon space typically extends at least about 80% of the length of the filter element from the first end to the second end thereof, and typically at least about 90% of the effective filtering length of the filter element. For example, the siphon shield may comprise a substantially circular cross section substantially solid wall plastic tube and the filter element may be substantially cylindrical (and may be solid or hollow, preferably hollow), and the substantially annular siphon space has substantially uniform dimensions (that is the thickness of the annular space is approximately the same throughout the extent of the shield and filter element).

According to another aspect of the present invention, the filter element first end is operatively connected to a drinking straw; and the mounting element mounts the siphon shield adjacent the first end of the filter element so that water can substantially only flow into the siphon space from adjacent the second end of the filter element, and wherein the siphon space is readily accessible to water adjacent a bottom of a bottle in which the filter element and a portion of the drinking straw are disposed. The details of the mounted element, annulus, etc. for this embodiment are preferably as described above.

The siphon shield and the mounting element (e.g. mounting ring) are preferably integral and made of rigid plastic. The filter element may be "naked", that is uncovered by an accessory housing, or may be covered by an apertured decorative plastic housing, such as those sold by Innova Pure Water, Inc. as standard components of Innova "A" and "B" filters. The mounting element may be ultrasonically welded to the decorative housing, or attached by adhesive, or attached by adhesive directly to the external periphery of the carbon block filter element, or affixed by other known or conventional attachment techniques, such as a friction fit (which makes the shield removable).

According to another aspect of the present invention a filter assembly is provided comprising the following components: A primarily radial flow filter element comprising a substantially prismatic or cylindrical body of filtering material having a first end through which filtered water flows, and a second end opposite the first end. A substantially tubular solid shield having cross-sectional interior dimensions greater than the exterior cross sectional dimensions of the filter element. A mounting element which mounts the shield around the filter element so that there is a space between the filter element and the siphon shield. A cap for closing the open end of a bottle, the cap having a manual valve associated therewith. The filter element first end operatively connected to the cap wherein the mounting element mounts the shield adjacent the second end of the filter element so that water can substantially only flow into the space from adjacent the first end of the filter element, and wherein the space is readily accessible to water adjacent the cap. The mounting element may comprise a mounting ring, and the space may be a substantially annular siphon space, and the substantially annular siphon space may extend at least about 90% of the effective filtering length of the filter element. Other details of the components may be as described above.

According to another aspect of the present invention a filter assembly is provided comprising the following components: A primarily radial flow filter element comprising a substantially prismatic or cylindrical body of filtering material having a first end through which filtered water flows, and a second end opposite the first end. A substantially tubular shield having cross-sectional interior dimensions greater than the exterior cross sectional dimensions of the filter element. A mounting element which mounts the shield around the filter element so that there is a siphon space between the filter element and the shield. A drinking straw. The filter element first end operatively connected to the drinking straw. And wherein the mounting element mounts the shield adjacent the first end of the filter element so that water can substantially only flow into the siphon space from adjacent the second end of the filter element, and wherein the space is readily accessible to water adjacent a bottom of a bottle in which the filter element and a portion of the drinking straw are disposed. The filter element may extend axially outwardly from the shield adjacent the second end of the filter element so as to be sure to allow access to the substantially annular space between the filter element and the shield. The details of the components may be as described above.

Using the filter assemblies according to the present invention, whether with a squeeze bottle having a cap with a push-pull valve, or a sports bottle with a straw extending outwardly of the sports bottle cap, it is possible to effectively filter water yet minimize the amount of air ingested during the expelling or suction action by which the water is moved out of the bottle. In this way the amount of liquid that can effectively be removed from the bottle (without undesirable affects) is greatly enhanced compared to the prior art, with a minimum of additional costs or difficulty.

BRIEF DESCRIPTION OF THE DRAWINGS

FIG. 1 is a side view, primarily in cross section, but partially in elevation, of an exemplary filter assembly mounted on a cap for a bottle according to the invention, with a siphon shield mounted in association with the filter element so as to minimize aspiration during dispensing of water from the bottle with which the filter assembly is associated, the bottle being shown in dotted line in FIG. 1;

FIG. 2 is a side view, partly in cross section and partly in elevation, of another embodiment according to the present invention in which the filter and shield are mounted in a sports bottle containing a drink straw; and FIG. 3 is a bottom plan view of the filter assembly of FIG. 2 and FIG. 4 is a top plan view thereof.

DETAILED DESCRIPTION OF THE DRAWINGS

A filter assembly according to one embodiment of the present invention is shown generally by reference numeral 10 in FIG. 1, in association with a cap 11 for closing the open end of a plastic squeeze bottle 22 or the like, shown in dotted line in FIG. 1. The cap 11 and filter assembly 10 may be basically as described in U.S. Pat. No. 5,609,759 and in copending application Ser. No. Ser. No. 09/008,845, filed Jun. 20, 1998, with changes indicated according to the invention.

The filter assembly 10 according to the invention comprises primarily radial flow filter element 12, a substantially tubular shield 13, and a mounting element 14 for operatively mounting the shield 13 to the filter element 12. In the embodiment illustrated in FIG. 1 the filter element 12 is a substantially prismatic or cylindrical bare body of filtering material (either solid or hollow) having a first end 15 through which filtered water flows, and a closed second end 16 opposite the first end. The filtering element 12 as illustrated in FIG. 1 comprises a hollow substantially continuous self-supporting, self-venting body of activated carbon and binder having a porosity of about 10–120 microns, and capable of effectively reducing the amount of chlorine in tap water flowing therethrough by at least 50% at a rate of 5 milliliters per second, such as described in U.S. Pat. No. 5,609,759 and said copending application. The second end 16 of the filter element 12 may be encased in a plastic cap so that there is substantially no truly axial flow into the filter element 12, or the second end 16 may be exposed (bare) carbon block material, or the end 16 may comprise a solid cap with axial vent holes therein.

The first end 15 of the filter element 12 is operatively connected to the cap 11 by any suitable mounting structure, a number of which are disclosed in the U.S. Pat. No. 5,609,759 and said copending application. Merely for the purposes of illustration in FIG. 1, this connection is illustrated by a solid relatively rigid plastic cap 17 which fits over the open end 15 of the filter element 12 and defines an inner tubular projection 18 which receives a smaller diameter tubular filter mount 19 integral with the cap 11. A manual valve 20, such as a conventional push-pull valve as used in conventional bicycle bottles (or any other conventional type valve such as illustrated or disclosed in U.S. Pat. No. 5,609,759 and said copending application) is also provided. The cap 11 is typically releasably attached, as by internal screw threads 21, to external screw threads at the open top of the bottle 22.

What has heretofore described, except for the shield 13 and mounting element 14, is conventional. However, the shield 13 and mounting element 14 according to the invention greatly enhance the functionality of the conventional filter 12 by minimizing aspiration through the filter element 12 as the bottle is nearing empty, and in fact essentially eliminating aspiration (or at least reducing it so that it only occurs for the very last amount being dispensed) e.g. to or allow effective dispensing of virtually all of the liquid in the bottle 22 without aspiration. The shield 13, which may be referred to as a siphon shield or shroud is of substantially rigid, plastic and is substantially solid walled in the preferred embodiment, and is mounted by the mounting element 14 so that a space, which may act as a siphon space, 24 is provided between the exterior surface of the filter 12 and the interior surface of the shield 13. The shield 13 preferably extends at least about 80% of the distance between the ends 15, 16 of the filter element 12, and typically at least 90% of the effective filtering length of the element 12 (which is the length of the element 12 through which liquid may radially flow during normal use).

The mounting element 14 may comprise any suitable known or conventional mounting element which is capable of positioning the shield 13 so that the space 24 is provided. In the preferred embodiment the mounting element 14 is a mounting ring, and the space 24 is a substantially annular space having substantially constant dimensions. The shield 13 is a tube which has cross-sectional area dimensions greater than the exterior cross-sectional dimensions of the filter element 12. While the filter element 12 may have almost any prismatic or cylindrical shape, preferably it is cylindrical, having a circular cross section, and the shield 13 therefore is also a hollow cylinder having a circular cross section. However, if the filter element 12 has a square or other polygonal cross section, the tubular shield 13 preferably has a like cross section (e.g. square).

The substantially constant width of the annular space 24 from the interior of the shield 13 and the exterior of the filter element 12 is not highly critical, as long as the space 24 is sufficient to allow water to relatively easily flow into the space 24 when the cap 12 is inverted, such as when a user has opened the valve 20 and has inverted the cap 11 and/or is squeezing on the bottle 22 to dispense water. While not critical, the space 24 can be dimensioned to provide some sort of a capillary action. In the preferred embodiment, however, the width of the spacing 24 is substantially uniform around the annulus, and is between about 0.005–0.25 millimeters, preferably about 0.1–0.15 millimeters.

The mounting ring 14 may be attached to the element 12 by any suitable mechanism. For example, where the shield 13 and mounting ring 14 are an integral piece of relatively rigid plastic, and where a plastic end cap is provided on the filter 12, the plastics may be ultrasonically welded together, or attached together by adhesive, or have a friction fit (so that the shield 13 is removable, replaceable, usable with other filters, and can be turned 180° and reoriented). Alternatively, the mounting ring 14 may be adhesively directly connected to the filter element 12, or a non-porous lacquer or the like provided adjacent the end 16 of the filter element 12 to which the ring 14 is adhesively secured; or a mechanical connection could be provided, such as O-rings, or other elastomeric sealing elements, or a friction fit of a tapered element with an end stop. In any event, the connection between the mounting ring 14 and the filter element 12 should substantially prevent the flow of liquid into the siphon space 24 from the second end 16 of the filter element 12. Rather, water should flow into the space 24 only through the open annular passageway shown schematically at 26 in FIG. 1 adjacent the cap 11, so that the siphon space 24 is readily accessible to water adjacent the cap 11 (when the bottle 22 is tilted or inverted for dispensing of the water therein).

If desired, structures to assist in fail safe proper mounting of the shield 13 may be provided such as a plurality (e.g. 2–4) of circumferentially spaced aligning ribs 27 integral with the interior of the shield 13 (and occupying the space 24) and/or mounting ring 14, and one or more (if more than one, circumferentially spaced) positioning flanges 28 integral with mounting ring 14 and extending substantially radially inwardly therefrom.

The embodiment of FIG. 2 is similar to that of FIG. 1 except that it is for a straw mounted configuration of the filter element. Components in the FIGS. 2 through 4 embodiment comparable to those in the FIG. 1 embodiment are shown by the same reference numeral only preceded by a "1".

In the FIG. 2 embodiment, the filter assembly 110 includes the filter element 112 which may be identical to the element 12, as described above. In the embodiment actually illustrated in FIG. 2, however, the actual carbon block filter is shown disposed within a conventional (available from Innova Pure Water, Inc. of Clearwater, Fla.) rigid plastic apertured housing 30; the actual carbon block itself is visible at the apertures 31 in the housing 30. At the second end 116 the filter element includes a solid plastic housing component, which may have vent holes 29 (see FIG. 3).

The tubular mount 118 at the first end 115 of the filter element 112 in the FIG. 2 embodiment is connected to a plastic drinking straw 32, which may either extend into the tubular mount 118, or surround it, but in any event makes a substantially liquid tight connection. As is conventional per se, the drinking straw 32 extends through the cap 111 of the sport bottle 122, extending through a circular passageway 33 in the cap 11, and the straw 32 may have a highly flexible (e.g. accordion) portion 34, and a plastic cap 35 for closing the free end of the straw 32, which are conventional per se.

The shield 113, the mounting element (e.g. mounting ring 114), and the space (e.g. siphon space 124) in the FIG. 2 embodiment are substantially identical to the counterparts in the FIG. 1 embodiment, except that the mounting ring 114 is operatively connected to the filter element 112 adjacent the first end 115 thereof. A liquid tight connection between the mounting ring 114 and the filter element 112 may be a sonic weld between the housing 30 for the filter element 112 and the ring 114, or can be by adhesive, mechanically, or the like. In any event, water may pass into the annular siphon space 124 only through the substantially annular passageway 126 provided adjacent the second end 116 of the filter element 112.

In the FIG. 2 embodiment, it is desirable that the second end 116 of the filter element 112 extend slightly outwardly a distance from the tubular shield 113, as illustrated in FIG. 2. This distance, which need not be no more than about 0.1–0.3 millimeters, is provided so that if the second end 116 of the filter element 112 touches the bottom 37 of the bottle 122, the water can still flow into the siphon space 124 through the passageway 126. Instead of the second end 116 extending slightly outwardly from the tubular shield 113, the tubular shield 113 could have the same or a longer length than the filter element 112 adjacent the end 116 as long as the very bottom of the shield 113 was scalloped, apertured, castellated, or in some other way formed so that water can easily flow therethrough to the space 124. That is, in the FIG. 2 embodiment the siphon space 124 is readily accessible to water adjacent the bottom 37 of the bottle 122 in which the filter element 112 and a portion of the drinking straw 32 are disposed.

FIGS. 3 and 4 are top and bottom plan views of the filter assembly 110 per se, and serve to illustrate clearly (see FIG. 3) the substantially uniform dimension annular space 124 and the mounting ring 114.

When the filter assembly 10 in the FIG. 1 embodiment is used, the person drinking from, or dispensing water from, the bottle 22 inverts the bottle 22, opens the valve 20, and if necessary squeezes the bottle 22, to dispense water through the first end 15 of the filter 12 passing through the valve 20. Once the level of water goes below the second end 16 of the filter 12 there still is no aspiration because the tubular shield 13 prevents air from flowing radially through the filter element 12 where not covered by water. The water continues to flow upward into the siphon space 24 until there is virtually no water left adjacent the cap 11, and during substantially this entire time there is little or no aspiration.

Using the FIG. 2 embodiment, the user removes the cap 35 from the drinking straw 32 and sucks on the straw 32 outside of the bottle 122. Water is continuously pulled up into the siphon space 124, moves primarily radially through filter 112, and then passes upwardly through the straw 32 to the user's mouth. If necessary or desirable a vent (such as a check valve), as is conventional, and schematically illustrated at 39 in FIG. 2, may be provided to allow air to flow into the bottle 122 during the suction action. A similar vent could also be provided where appropriate in the bottle 22 or cap 11, if necessary in addition to the self-venting action of the filter 12. In any event, even when the level of water in the bottle 122 is far below the first end 115 of the filter element 112, there is little or no aspiration. Only when the level of water drops so low that air can pass through the passage 126 will there be aspiration.

It will thus be seen that according to the present invention a particularly effective yet simple filter assembly is provided for use with a water bottle or the like which minimizes undesirable aspiration of air through the primarily radial flow filter, and maximizes the amount of liquid that can be dispensed from the bottle without adverse aspiration. Normally all except about the last ounce or less of liquid in the bottle (22, 122) may be readily dispensed substantially without aspiration. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures, devices, and methods.

What is claimed is:

1. A filter assembly comprising:
    a primarily radial flow filter element comprising a substantially prismatic or cylindrical body of filtering material having a first end through which filtered water flows, and a second end opposite said first end;
    a substantially tubular siphon shield having cross-sectional interior dimensions greater than the exterior cross sectional dimensions of said filter element, said shield consisting of a single diameter wall comprising the exterior of said filter assembly;
    a mounting element which mounts said siphon shield around said filter element so that there is a siphon space between said filter element and said siphon shield;
    said siphon space cooperating with said siphon shield to significantly reduce the amount of air radially flowing through said filter element with water when parts of said filter element are uncovered by water; and
    wherein said filter element first end is operatively connected to a cap for closing the open end of a bottle, said cap having a manual valve associated therewith; and wherein said mounting element mounts said siphon shield adjacent said second end of said filter element so that water can substantially only flow into said siphon space from adjacent said first end of said filter element, and wherein said siphon space is readily accessible to water adjacent said cap.

2. A filter assembly as recited in claim 1 in combination with a squeezable bottle having an open end and an interior spaced from said open end, said cap closing said open end, and said filter element and siphon shield disposed completely within said bottle interior.

3. A filter assembly as recited in claim 1 wherein said mounting element comprises a mounting ring, and wherein said siphon space is substantially annular, and wherein said substantially annular siphon space extends at least about 80% of the length of said filter element from said first end to said second end thereof.

4. A filter assembly as recited in claim 1 wherein said filter element is bare and said shield forms a substantially annular space between said shield and said bare filter element.

5. A filter assembly as recited in claim 1 wherein said siphon shield consists essentially of a substantially circular cross-section substantially solid wall plastic tube, and wherein said filter element is substantially cylindrical; and wherein said siphon space is substantially annular and has substantially uniform dimensions.

6. A filter assembly in combination with a bottle having an open end opposite a bottom; said filter assembly comprising:
    a primarily radial flow filter element comprising a substantially prismatic or cylindrical body of filtering material having a first end through which filtered water flows, and a second end opposite said first end;
    a substantially tubular siphon shield having cross-sectional interior dimensions greater than the exterior cross sectional dimensions of said filter element, said shield consisting of a single thickness wall comprising the exterior of said filter assembly;
    a mounting element which mounts said siphon shield around said filter element so that there is a siphon space between said filter element and said siphon shield;
    said siphon space cooperating with said siphon shield to significantly reduce the amount of air radially flowing through said filter element with water when parts of said filter element are uncovered by water; and
    wherein said filter element first end is operatively connected to a drinking straw, said straw extending through said open end of said bottle; and wherein said mounting element mounts said siphon shield adjacent said first end of said filter element so that water can substantially only flow into said siphon space from adjacent said second end of said filter element, and wherein said siphon space is readily accessible to water adjacent said bottom of said bottle in which said entire filter element, and a portion of said drinking straws are disposed.

7. A filter assembly as recited in claim 6 wherein said filter element extends axially outwardly from said siphon shield adjacent said second end of said siphon filter element.

8. A filter assembly as recited in claim 6 wherein said mounting element comprises a mounting ring, and wherein said siphon space is substantially annular.

9. A filter assembly as recited in claim 8 wherein said substantially annular siphon space extends at least about 80% of the length of said filter element from said first end to said second end thereof.

10. A filter assembly as recited in claim 1 wherein said filter element comprises a hollow substantially continuous self-supporting, self-venting body of activated carbon and binder having a porosity of about 10–120 microns.

11. A filter assembly as recited in claim 1 wherein said siphon shield and mounting element are integral and made of rigid plastic; and wherein said filter element is covered by an apertured decorative plastic housing; and wherein said mounting element makes a friction fit with said decorative housing so that said shield is removable from said decorative housing.

12. A filter assembly as recited in claim 1 wherein said mounting element comprises a mounting ring, and wherein said siphon space is substantially annular; and wherein said substantially annular siphon space extends at least about 90% of the effective filtering length of said filter element.

13. A filter assembly as recited in claim 6 wherein said filter element comprises a hollow substantially continuous self-supporting, self-venting body of activated carbon and binder having a porosity of about 10–120 microns.

14. A filter assembly and bottle combination comprising:
    a squeezable bottle having an open end and an interior spaced from said open end;
    a primarily radial flow filter element comprising a substantially prismatic or cylindrical body of filtering material having a first end through which filtered water flows, and a second end opposite said first end;
    a substantially tubular substantially solid wall shield having cross-sectional interior dimensions greater than the exterior cross sectional dimensions of said filter element;

a mounting element which mounts said shield around said filter element so that there is a space between said filter element and said siphon shield;

a cap for closing said open end of a bottle, said cap having a manual valve associated therewith;

said filter element first end operatively connected to said cap;

said cap closing said open end and said filter element and siphon shield disposed completely within said bottle interior; and wherein said mounting element mounts said shield adjacent said second end of said filter element so that water can substantially only flow into said space from adjacent said first end of said filter element, and wherein said space is readily accessible to water adjacent said cap.

15. A filter assembly as recited in claim 14 wherein said mounting element comprises a mounting ring, and wherein said space is a substantially annular siphon space.

16. A filter assembly as recited in claim 15 wherein said substantially annular siphon space extends at least about 90% of the effective filtering length of said filter element.

17. A filter assembly as recited in claim 14 wherein said siphon shield comprises a substantially circular cross-section substantially solid wall plastic tube, and wherein said filter element is substantially cylindrical; and wherein said siphon space is substantially annular and has substantially uniform dimensions.

18. A filter assembly as recited in claim 15 wherein said mounting ring has a friction fit with said filter element or a decorative housing thereof, so that said shield may be readily removed therefrom.

19. A filter assembly comprising:

a primarily radial flow filter element comprising a substantially prismatic or cylindrical body of filtering material having a first end through which filtered water flows, and a second end opposite said first end;

a substantially tubular shield having cross-sectional interior dimensions greater than the exterior cross sectional dimensions of said filter element, said shield consisting of a single diameter wall comprising the exterior of the filter assembly;

a mounting element which mounts said shield around said filter element so that there is a siphon space between said filter element and said shield;

a drinking straw;

said filter element first end operatively connected to said drinking straw; and wherein said mounting element mounts said shield adjacent said first end of said filter element so that water can substantially only flow into said siphon space from adjacent said second end of said filter element, and wherein said space is readily accessible to water adjacent a bottom of a bottle in which said filter element and a portion of said drinking straw are disposed.

20. A filter assembly as recited in claim 19 wherein said filter element extends axially outwardly from said shield adjacent said second end of said filter element and wherein said mounting element comprises a mounting ring, and wherein said space is substantially annular.

21. A filter assembly as recited in claim 20 wherein said substantially annular space extends at least about 80% of the length of said filter element from said first end to said second end thereof, and comprises a siphon space.

22. A filter assembly as recited in claim 20 wherein said siphon shield consists of a a circular cross-section substantially solid wall plastic tube, and wherein said filter element is substantially cylindrical; and wherein said space is substantially annular and has substantially uniform dimensions.

23. A filter assembly as recited in claim 20 wherein said mounting ring has a friction fit with said filter element or a decorative housing thereof, so that said shield may be readily removed therefrom.

* * * * *

(12) EX PARTE REEXAMINATION CERTIFICATE (10262nd)
United States Patent
Nonren, Jr.

(10) Number: US 6,153,096 C1
(45) Certificate Issued: Aug. 19, 2014

(54) SHROUD FOR BOTTLE MOUNTED FILTERS

(75) Inventor: John E. Nonren, Jr., Clearwater, FL (US)

(73) Assignee: Seventh Generation Ventures, Inc., Burlington, VT (US)

Reexamination Request:
No. 90/012,452, Aug. 24, 2012

Reexamination Certificate for:
Patent No.: 6,153,096
Issued: Nov. 28, 2000
Appl. No.: 09/132,143
Filed: Aug. 10, 1998

(51) Int. Cl.
*C02F 1/00* (2006.01)
*C02F 1/28* (2006.01)

(52) U.S. Cl.
CPC .................................. *C02F 1/00* (2013.01)
USPC ........... 210/238; 210/282; 210/464; 210/469; 210/472; 222/189.08

(58) Field of Classification Search
None
See application file for complete search history.

(56) References Cited

To view the complete listing of prior art documents cited during the proceeding for Reexamination Control Number 90/012,452, please refer to the USPTO's public Patent Application Information Retrieval (PAIR) system under the Display References tab.

*Primary Examiner* — Carlos Lopez

(57) ABSTRACT

A radial flow filter for use in a bottle, such as a carbon block filter, having a substantially tubular solid wall siphon shield or shroud mounted at one end of the filter element and defining an annular siphon space. The shield is mounted adjacent one of the filter when it is connected to a cap for closing a bottle, having a manual valve (such as a push-pull valve), and is mounted adjacent the other end of the filter when the filter is connected to a drinking straw. The siphon shield allows dispensing of almost all of the water present at the cap when the bottle is inverted for the cap-mounted embodiment, or adjacent the bottom of the bottle for the straw-mounted embodiment, without drawing significant amounts of air through the filter through non-submerged portions of the filter. That is, the maximum amount may be dispensed from the bottle without aspirating air through the filter.

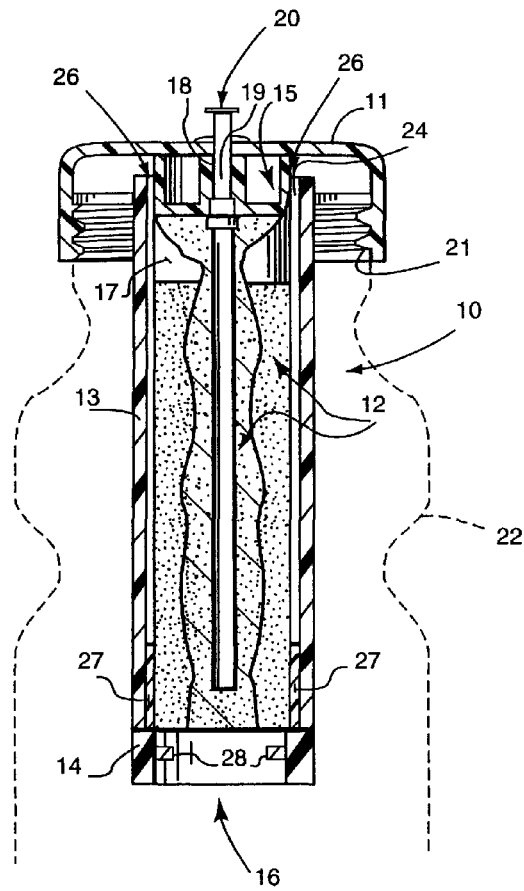

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-5, 10-12 and 14-18 is confirmed.

Claims 6-9, 13 and 19-23 are cancelled.

* * * * *